United States Patent [19]

Carmona, Jean

[11] Patent Number: 4,688,971
[45] Date of Patent: Aug. 25, 1987

[54] REAMER TOOL - HOLDER FOR TOOLING MACHINE PARTS

[75] Inventor: Carmona, Jean, Rhone, France

[73] Assignees: Carole, Rhone; Outillage R.C., Seine et Marne, both of France

[21] Appl. No.: 567,542

[22] Filed: Jan. 3, 1984

[30] Foreign Application Priority Data

Jul. 19, 1983 [EP] European Pat. Off. ........ 83420129.5

[51] Int. Cl.⁴ .............................................. B23D 77/04
[52] U.S. Cl. ...................................... 408/185; 407/45; 408/233; 408/713
[58] Field of Search ............... 408/181, 182, 183, 185, 408/233, 239 R, 713; 407/37, 45

[56] References Cited

U.S. PATENT DOCUMENTS

| | | | |
|---|---|---|---|
| 2,382,571 | 8/1945 | Kylin | 408/181 |
| 2,398,491 | 4/1946 | Bell | 408/181 |
| 2,484,480 | 10/1949 | Anderson | 408/181 |
| 2,979,974 | 4/1961 | Craig | 408/183 |

FOREIGN PATENT DOCUMENTS

| | | | |
|---|---|---|---|
| 2497704 | 7/1982 | France | 408/181 |
| 120637 | 1/1948 | Sweden | 408/185 |

Primary Examiner—Z. R. Bilinsky
Attorney, Agent, or Firm—Harry M. Weiss & Associates

[57] ABSTRACT

The invention covers the control of the horizontal position of a reamer cutting tool in relation to a tool-holder pin.

A support is surmounted by a core which slides sideways in the pin. The slide is controlled by a screw whose head forms a vernier, while its crown wheel is engaged tangentially by a worm screw. A flange holds the whole mechanism in place horizontally. A locking screw locks the support into position once an angle has been fixed.

The invention has the following features: reduction in the overall diameter of the tool; and increase in precision by the suppression of action which would interfere with the precision adjustment and throw it out of tolerance at the moment the device is finally locked into position.

1 Claim, 9 Drawing Figures

REAMER TOOL - HOLDER FOR TOOLING MACHINE PARTS

BACKGROUND OF THE INVENTION

This invention concerns a holder for a reaming tool to be used on a reamer for tooling machine parts.

The reamer is a machine tool which bores the interior diameter of a cylinder to a very precise measurement, with very narrow tolerances. The tool is mounted on a pin which revolves inside the cylinder being machined. The dimension of the bore thus depends on the position of the tool in relation to the pin.

Difficulties are frequently encountered when adjusting the position of the tool on its support. In fact, with current devices, once the position of the cutting edge has been precision adjusted, the operator may inadvertently alter this position while locking and wedging the tool into the support.

The intention of the invention is to produce a reaming tool-holder which will enable precision adjustment of the position of the tool without necessitating the removal of the tool from its support in order to make such adjustment.

SUMMARY OF THE INVENTION

A reaming-tool holder designed according to the invention consists of a cutting tool detachable from its support and a pin to which the support is fixed. In this invention, the support is mounted in such a way as to enable it to slide across the pin. The sliding action is controlled by a screw and nut arrangement equipped with an angle fixing device and a means of locking in position or releasing the support, the controls, and the angle fixing device simultaneously and in a single operation.

Another feature of the invention is that the support has a smooth core fixed to slide horizontally across a diametric slit at the tip of the pin. The support is held in place by a screw whose head and threaded tip respectively support the two ends of the pin locatd at each end of the diametric slit, while the body of the screw passes through an elongated opening cut into the smooth core of the support which is lodged in the slit, between the two ends of the pin.

Another feature of the invention is that the screw regulating the smooth core of the support is part of a crown wheel which operates a tangential worm, whose head is controlled from the outside by means of a tool in common use, such as a spanner or screwdriver.

A further feature of the invention is that the vernier screw which engages the core of the support and the tangential release mechanism screw have axes which are geometrically at right angles to each other and at right angles to the direction of the vertical axis of the pin.

Another feature of the invention is that the tangential release screw lies behind and parallel to a fixed flange recessed vertically into the body of the pin. This fixed flange bears on its lower part a fork which fits around the supporting tangential release screw, between its head and the crown wheel, to immobilise the screw and its tangential crown in the direction of their axes inside the pin, while allowing them to turn freely.

A further feature of the invention is that the revolving head of the vernier screw possesses an exterior diameter which is approximately equal to the width of the fixed flange within the pin. Thanks to this arrangement, it will be seen that the action of locking the support in place by bringing the two sides of the end of the pin together simultaneously locks the controls, that is the vernier screw, yet does not subject it to any movement liable to alter its setting.

In another feature of the invention, the tip of the pin consists of a diametric slit situated between two straight sides, joined by a horizontal locking screw which also passes across an elongated opening cut into the smooth core of the tool support, this smooth core being lodged within the slit where it can slide crosswise, thus ensuring its smooth passage.

The attached drawing, given as a unrestrictive example, will enable better comprehension of the features of the invention.

DETAILED DESCRIPTION OF THE INVENTION

Figure 1:
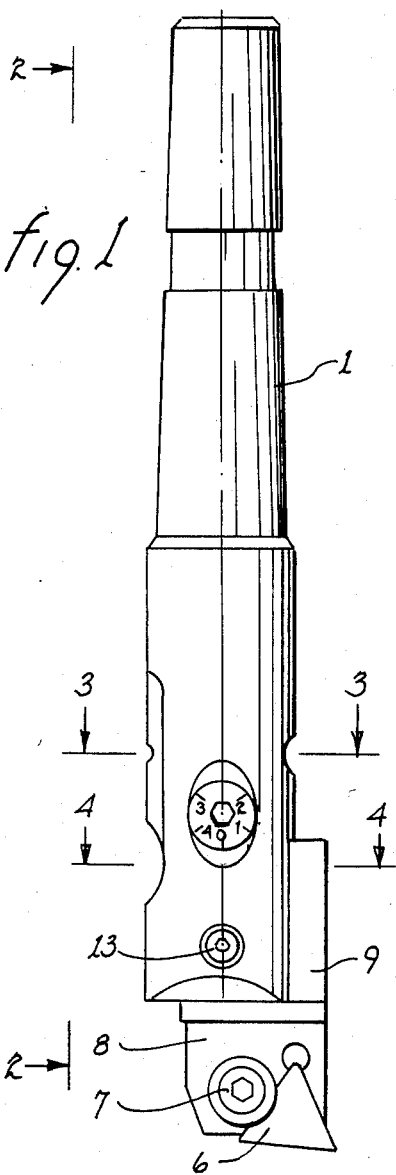
FIG. 1 is a frontal view, showing the whole reaming pin and reamer installed as per the invention.

These drawings feature a pin 1 with an integral shank of a common type of which the conical tip can be adapted in the usual way for use in a machine tool such as a reamer. The pin 1 with an integral shank has a diametric slit 2, on each side of which are two side faces 3 and 4. The internal surface of side 4 is grooved horizontally 5.

Figure 8:
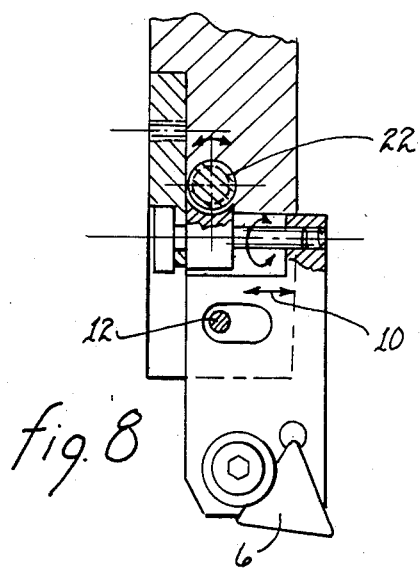

The reaming tool is a cutting tool 6 of the usual type, with a screw 7 which can lock it on its support 8. In the invention, the support 8 is topped by a smooth core 9, of which it forms an integral part. The core fits into the slit 2 between the two sides 3 and 4, where it can slide crosswise (FIG. 8, double arrow 10). This crosswise movement is guided by the flush fitting of the grooves 5 and the side 4, along corresponding grooves cut into the surface facing the smooth core 9.

The core has an elongated opening 11 cut into it, which crosses a locking screw 12. The head 13 of the latter is supported by the side 3 in which it is recessed, while its theaded tip is screwed into a correspondingly threaded hole in side 4.

On the upper part, the core 9 has an extension 14, which has a horizontal threaded hole into which the threaded body 15 of an advancing screw is inserted. This screw 15 is part of a crown wheel 16, and terminates above it in a circular head 17. The part of the head facing away from the tool is marked with radial gradations 18. The geometric axis 19 of the adjustor screw 15, 16 and 17 is fixed at right angles to the vertical axis 20 of the pin 1 with an integral shank.

Figure 5:
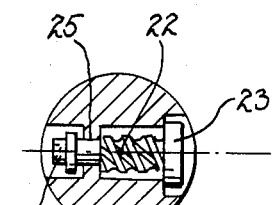
FIGS. 5 and 6 are cross-sections respectively following V—V and VI—VI (FIG. 2).
Figure 6:
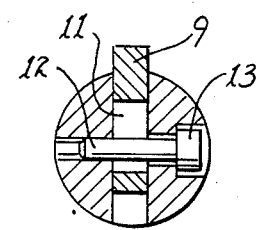
Figure 7:
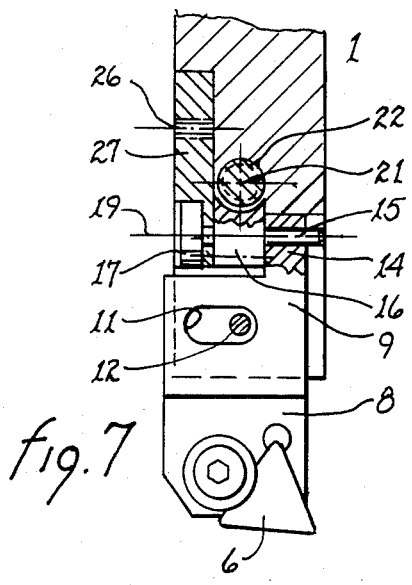
FIGS. 7 and 8 are cross-sections following VII—VII (FIG. 2), corresponding to the two different positions for adjusting the cutting tool.

The two axes 19 and 20 are themselves at right angles to a third axis 21, that of the control screw 22 (FIG. 5). The control screw 22 is a worm which is engaged tangentially by the crown 16. The head 23 of the worm 22 is accessible from the outside, for instance with a screwdriver or hexagonal spanner which can be used to control its rotation.

The free extremity 24 of the worm 22 is immobilized along its axis in relation to a fixed barrier 25 defined in the pin 1 with an integral shank, with the aid of a circlip.

Figure 9:
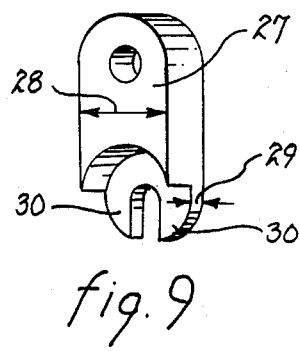
FIG. 9 is a view in perspective showing the fixed flange in isolation.

Finally, a fixed flange of the type shown in FIG. 9 is recessed laterally in a housing in the pin 1 with an integral shank, where it is immobilized by a screw 26. This flange 27 has a body consisting of two parallel edges, and its width 28 is roughly equal to the exterior diameter of the vernier head 17 of the control screw 15, 16 and 17. In the lower part of the flange 27, whose thickness 29 is reduced, it holds a fork whose two prongs 30 surround the vernier head 17 and the crown wheel 16, on either side of the body of the vernier screw, in order to immobilize it along its axis, while allowing it to turn freely.

The device functions as follows:

When the screw 12 and 13 is locked in position, the smooth core 9 of the support 8 is pressed between the two sides 3 and 4, and the tool is ready for machining. Simultaneously, the round head 17 of the vernier screw 15, 16 and 17 is immobilized, as a result of this pressure.

Figure 2:
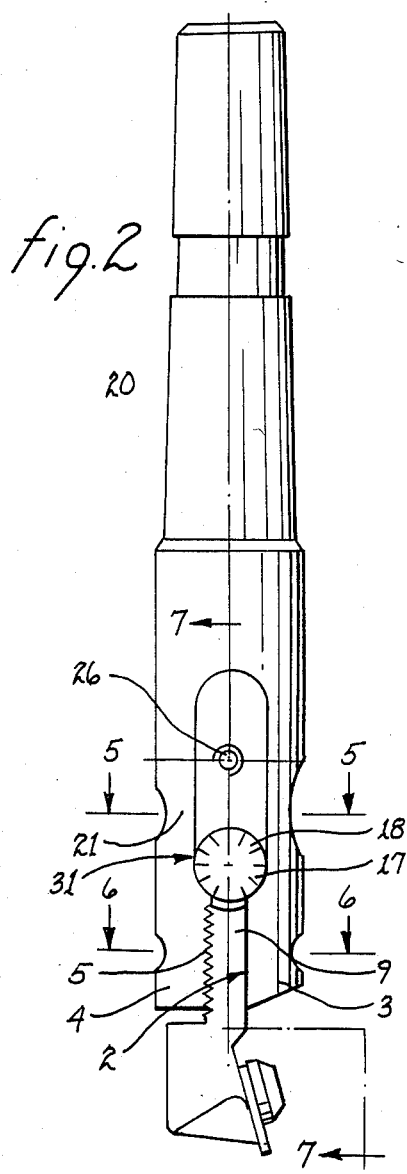
FIG. 2 is a lateral view following II.
Figure 3:
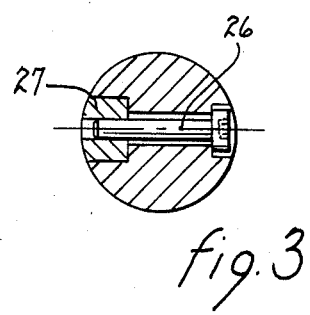
FIGS. 3 and 4 are cross-sections which follow III—III and IV—IV (FIG. 1).
Figure 4:
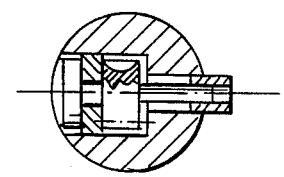

To alter the controls, that is to move the cutting blade of the tool 6 sideways in relation to the geometric axis of the pin 20, the operator merely has to unscrew 12 and 13 and adjust the head 23 of the worm 22. When the latter is turned, there is a resulting action on the control screw 15, 16 and 17 whose angle of rotation can be measured accurately, thanks to the vernier which consists of the gradations 18 moving in front of a fixed marker such as 31 (FIG. 2). Once the position of the tool has been accurately fixed, only a single operation is necssary, consisting of locking the screw 12 and 13 to immobilize all the parts of the tool-holder at once, the core 9 and the head 17 of the vernier screw 15, 16 and 17 without incurring any interfering movement which could thrown the mechanism out of tolerance.

In additon to this advantage, the device built along the lines of the invention has many other features, in particular:

(a) the whole device consists of very few parts which reduces the number of operations involved;

(b) the whole device can be given a very small overall exterior diameter, which would be particularly suitable for very small bores;

(c) the fixed flange 27 imprisons the control screw 15, 16 and 17 along its transverse axis, while allowing it to turn for a light rubbing action: the amount of play is thereby also restricted;

(d) the device is extremely simple to operate, since all it requires is, for example, the knowledge that twenty turns of the spanner or the worm 27 correspond to one turn of the vernier 17; there is thus no danger of making mistakes in counting an important number of turns, for instance forty for the head 23 of the control screw.

While the invention has been particularly shown and described in reference to preferred embodiments thereof, it will be understood by those skilled in the art that changes in the form and details may be made therein without departing from the spirit and scope of the invention.

I claim:

1. A radially adjustable tool comprising a cutting tool, a support and a pin, said cutting tool attached adjustably to said support and said pin, said cutting tool having an integral shank to which said support and said pin are fixed, said pin has on its tip a diametric slit passing therethrough, said support being mounted to slide crosswise along said diametric slit of said pin, a screw and a nut mechanism, said crosswise movement being operated by said screw and said nut mechanism operably attached to said pin having a means for determining an angle and having a means suitable for locking and releasing said support, controls, and an angle-fixing device together and in a single operation, said support having a smooth core located within said diametric slit arranged to slide sideways therethrough, a locking screw, said support being locked into position by said locking screw having a head and threaded top supported respectively by two sides of said pin situated on each side of said diametric slit, said screw passing through an elongated opening cut into said smooth core of said support which is itself positioned inside said slit between said two sides of said pin said screw of said screw and nut mechanism comprises an adjusting screw governing said core of said support, said adjusting screw having a head marked with gradations visible from the outside which can be adjusted using an exterior angle-fixing device which becomes a rotating face of an angle-fixing vernier, said adjusting screw further comprises a crown wheel which is an integral part of a holder, said wheel governing a tangential worm screw having a head which is operated from the outside by a tool such as one of a spanner and screwdriver, said adjusting screw further comprises a threaded body and operates within said smooth core of said support, said tangential worm screw is generally positioned at a right angle and located thereabove said adjusting screw for tangentially operating thereof, said adjusting screw is generally positioned at a right angle and located thereabove said locking screw to permit said screw in locking and unlocking communications with said adjusting screw for accomplishing desired adjustment of said cutting tool by way of readings provided by said gradations, said tangential release worm screw and said adjusting screw having geometric axes at right angles to each other and at right angles to the direction of a vertical axis of said pin, a fixed flange having on its lower part a fork whose prongs lock around said adjusting screw between said head and said crown wheel of said adjusting screw in order to immobilize said screw and said crown wheel along their axis inside said pin while permitting said screw and said wheel to turn freely, said tangential release worm screw lying behind and parallel to said fixed flange, said head of said adjusting screw being a revolving head having an exterior diameter roughly equal to the width of said fixed flange, said locking screw locking said support in position by bringing said two sides of the end of said pin together locking said adjustable screw controls and said core simultaneously without subjecting them to any movement which would alter their setting, said smooth core being a flat core lodged within said slit so that it can slide crosswise, said flat core being grooved transversely to ensure its smooth movement over corresponding groves in said pin.

* * * * *